(12) United States Patent
Shinohara

(10) Patent No.: US 6,977,779 B2
(45) Date of Patent: Dec. 20, 2005

(54) IMAGING LENS

(75) Inventor: Yoshikazu Shinohara, Saitama (JP)

(73) Assignee: Fujinon Corporation, Saitama (JP)

( * ) Notice: Subject to any disclaimer, the term of this patent is extended or adjusted under 35 U.S.C. 154(b) by 133 days.

(21) Appl. No.: 10/768,112

(22) Filed: Feb. 2, 2004

(65) Prior Publication Data

US 2004/0150893 A1  Aug. 5, 2004

(30) Foreign Application Priority Data

Feb. 4, 2003 (JP) ............................. 2003-027549

(51) Int. Cl.$^7$ ............................ G02B 13/18; G02B 9/16
(52) U.S. Cl. ........................................ 359/716; 359/785
(58) Field of Search .............................. 359/716, 715, 359/714, 713, 785

(56) References Cited

U.S. PATENT DOCUMENTS 6,441,971 B2    8/2002  Ning
6,728,047 B2 *  4/2004  Sato et al. ................. 359/786
6,747,810 B2 *  6/2004  Sato ........................... 359/715

FOREIGN PATENT DOCUMENTS

JP    2002-517773    6/2002
JP    2002-221659    8/2002

* cited by examiner

Primary Examiner—Scott J. Sugarman
(74) Attorney, Agent, or Firm—Arnold International; Jon W. Henry; Bruce Y. Arnold

(57) ABSTRACT

An imaging lens for an image pickup device is formed of only three lens components of positive, negative, and positive refractive power, in order from the object side. A diaphragm stop is positioned on the object side of the lens component nearest the object side. Six lens component lens surfaces are aspheric. The lens component nearest the object side is biconvex with regard to the central areas of its two lens surfaces. The image-side surface of the lens component nearest the image side has a concave central area surrounded by a convex surface area. The middle lens component has one lens surface with a concave central area and one lens surface with a convex central area. The Abbe number of the central lens element and the ratio of the focal length of the imaging lens divided by the focal length of the object-side lens component satisfy specified conditions.

16 Claims, 2 Drawing Sheets

Spherical Aberration

Astigmatism

Distortion

Spherical Aberration

Astigmatism

Distortion

IMAGING LENS

BACKGROUND OF THE INVENTION

Imaging devices using image pickup devices such as CCD's (Charge Coupled Devices) and CMOS's (Complementary Metal Oxide Semiconductors) are well known. In such imaging equipment, an image is formed on the image pickup device and electrical signals from the image detector are processed in order to form a viewable image. Recently, along with advancements in miniaturizing the imaging equipment, the entire imaging system has become much smaller.

Video cameras and digital still cameras (hereinafter referred to simply as digital cameras) for image input to cell phones have recently been significantly reduced in size. Imaging lenses used for the small imaging systems used in these devices are conventionally made of a single lens element in view of the small size and portability required.

While imaging devices have been developed to be smaller in recent years, they also have been developed with increasing numbers of pixels in the images. Consequently, improved optical properties have been demanded for the imaging lenses used in these imaging devices. Imaging lenses with only one or two lens elements do not provide adequate optical properties, including correction of aberrations, in the images produced by these devices.

In order to provide for improved correction of aberrations as needed in imaging devices having a large number of pixels, imaging lenses with a larger number of lens elements, namely with three lens elements have been developed. For example, Japanese Laid-Open Patent Application 2002-221659, Japanese Laid Open Patent Application 2002-517773, and U.S. Pat. No. 6,441,971 disclose such three-element imaging lenses.

However, although increasing the number of lens elements enables the image forming properties of the imaging lens to be improved, the overall length of the imaging lens tends to become longer compared to an imaging lens having only two lens elements. Accordingly, the lenses described in the above-mentioned Japanese Laid-Open Patent Application 2002-221659 and in U.S. Pat. No. 6,441,971 do not fully satisfy the requirement for compactness. Consequently, further improvements in imaging lenses are needed in order to obtain the small size and portability desired by the marketplace.

In addition, in imaging lenses for imaging devices as described above, various optical performance characteristics may be advantageous based on the characteristics of the imaging devices used. For example, in general, when image pickup devices such as CCD's are used, due to their characteristics, it is desirable that the light rays strike the image surface nearly parallel to the surface normal, i.e. at a small angle of an incidence. Thus, it is desirable that the imaging lens be arranged to be telecentric on the image side. Therefore, for optimum imaging performance, the properties of the imaging lenses need to match the characteristics of other parts of the imaging devices.

BRIEF SUMMARY OF THE INVENTION

The present invention relates to an imaging lens with optical performance characteristics suitable for imaging devices that are compact and that provide a large number of pixels in the image.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
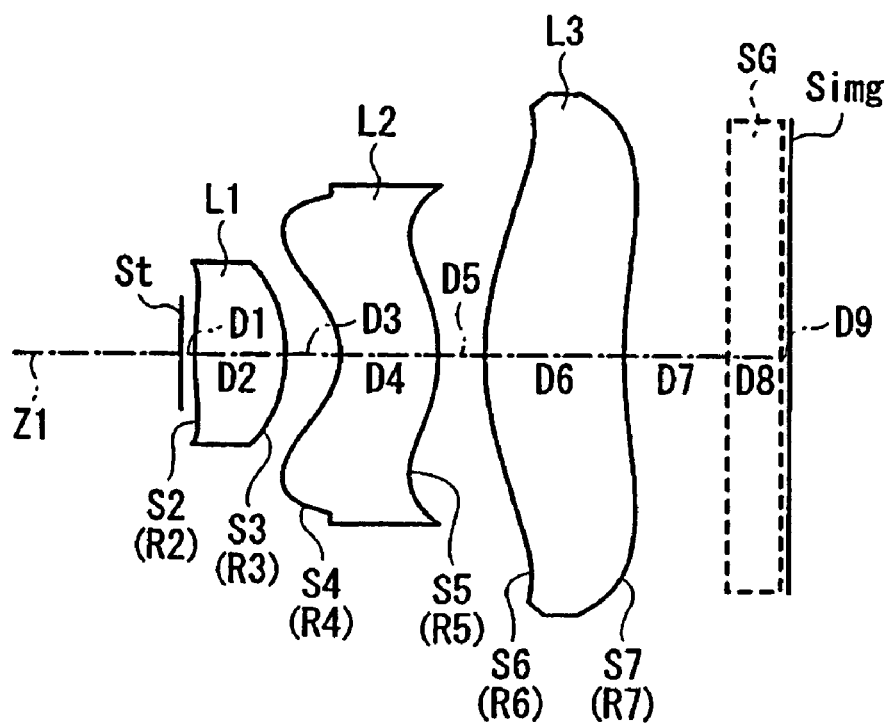
FIG. 1 is a cross-sectional view of the imaging lens according to Embodiment 1.

A general description of the preferred embodiments of the imaging lens of the present invention will now be described with reference to FIG. 1 that shows Embodiment 1. In FIG. 1, the lens elements are referenced by the symbols L1, L2, and L3, in order from the object side of the imaging lens. Similarly, the lens surfaces are referenced by the letter S followed by a number denoting their order from the object side of the imaging lens, from S2 to S7, and the radii of curvature of the lens elements are referenced by the letter R followed by a number denoting their order from the object side of the imaging lens, from R2 to R7, that parenthetically accompany the lens surface labels. The on-axis surface spacings along the optical axis Z1 of the various optical surfaces are referenced by the letter D followed by a number denoting their order from the object side of the imaging lens, from D1 to D9.

Definitions of the terms "lens element" and "lens component" that relate to the following detailed description will now be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the image forming properties of the lens elements or (b) two or more lens elements that have their adjacent lens surfaces either in full overall contact or overall so close together that the spacings between adjacent lens surfaces of the different lens elements are so small that the spacings can be neglected in computing the image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens elements" above, in the two preferred embodiments of the imaging lens of the present invention described below, lens elements L1, L2, and L3 are also lens components. Thus, the present invention may variously be described in terms of lens elements or in terms of lens components.

As shown in FIG. 1, the imaging lens of the present invention is a three-component, three-element imaging lens that includes, arranged along the optical axis Z1 in order from the object side, a first lens element L1, a second lens element L2, and a third lens element L3. A diaphragm stop St that operates as an aperture stop is arranged in a position nearer the object side than is the first lens element L1. That is, the diaphragm stop St is arranged nearest the object side within the imaging lens. Placing the diaphragm stop St as specified closest to the object side, i.e., in front of the first lens element L1, assists providing an imaging lens having a telecentric property on the image side, which is desirable in conjunction with the use of a CCD image pickup device.

An image pickup device such as a CCD (not shown) is arranged at the image plane Simg of the imaging lens. As indicated by the dotted lines in FIG. 1, a transparent, parallel-plate cover plate SG may be inserted between the third lens element L3 and the image plane Simg for the purpose of protecting an optical filter or optical filters, and/or the image pickup device. Each of the lens surfaces of the lens elements L1, L2, and L3 are aspheric so that the imaging lens includes a total of six aspherical lens surfaces. As the lens material, either optical glass or plastic can be used. However, the refractive power of the first lens element L1 is greater than that of the other lenses, and it is desirable that the first lens element L1 be made of optical glass because optical glass is superior to plastic in terms of its optical properties remaining stable with variations in temperature. When plastic, which has a larger linear coefficient of expansion, is used, fluctuations in the focus position become greater for a given change in temperature. Using optical glass, these fluctuations can be reduced to the point that the focus position changes only slightly with normal temperature variations.

The six aspheric lens surfaces satisfy the following equation:

$$Z=[(CY^2)/\{1+(1-K \cdot C^2 \cdot Y^2)^{1/2}\}]+\Sigma(A_i \cdot |Y^i|) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface near the optical axis, Y is the distance (in mm) from the optical axis, K is the eccentricity, and $A_i$ is the ith aspheric coefficient, and the summation extends over i equals three to ten.

With reference to FIG. 1, the following phrases have the following meanings with regard to the lens surfaces of the present invention.

As shown in FIG. 1, the first lens element L1 has positive refractive power, its lens surface on the object side S2 is convex in a central area near the optical axis Z1, its lens surface on the image side S3 is convex, and the first lens element L1 is rotationally symmetric about the optical axis Z1. Also as shown in FIG. 1, the second lens element L2 has negative refractive power, its lens surface S4 on the object side is concave at a central area near the optical axis Z1 and becomes convex at the periphery, its lens surface S5 on the image side is convex in a central area near the optical axis Z1 and becomes concave at the periphery, and the second lens element L2 is rotationally symmetric about the optical axis Z1. The third lens element L3 has positive refractive power, its lens surface S6 on the object side is convex in a central area near the optical axis Z1 and becomes concave at the periphery, its lens surface on the image side S7 is concave in a central area near the optical axis and becomes convex at the periphery, and the third lens element L3 is rotationally symmetric about the optical axis.

Preferably, the imaging lens satisfies the following condition:

$$25 < v_2 < 45 \quad \text{Condition (1)}$$

where $v_2$ is the Abbe number of the second lens element L2.

The Abbe number $v_2$ above is defined as follows:

$$v_2 = (N_d - 1)/(N_F - N_C)$$

where $N_d$ is the refractive index at the d-line (587.6 nm) of the lens material of the second lens element L2, $N_F$ is the refractive index at the F-line (486.1 nm) of the lens material of the second lens element L2, and $N_C$ is the refractive index at the C-line (656.3 nm) of the lens material of the second lens element L2.

Condition (1) is a condition for favorably correcting lateral color. If the value in Condition (1) is larger than the upper limit of Condition (1), lateral color generated by the first lens element L1 and the third lens element L3 becomes so great that it cannot be canceled by the lateral color of opposite sign of the second lens element L2, and the lateral color of the imaging lens becomes difficult to correct. On the other hand, if the value in Condition (1) is smaller than the lower limit of Condition (1), the lateral color generated by the second lens element L2 becomes so great that it cannot be canceled by the lateral color of opposite sign generated by the first lens element L1 and the third lens element L3. Accordingly, residual lateral color exists for the imaging lens in either case. However, lateral color can be corrected by the first lens element L1 and the third lens element L3 having positive refractive power, the second lens element L2 having negative refractive power, and by satisfying Condition (1) above.

Additionally, preferably the following condition is satisfied:

$$1.3 < f/f1 < 1.8 \quad \text{Condition (2)}$$

where f is the focal length of the imaging lens, and f1 is the focal length of the first lens element L1.

By satisfying Condition (2), various aberrations, especially spherical aberration, can be favorably corrected. If the ratio of Condition (2) is smaller than the lower limit of Condition (2), sufficient refractive power is not obtained from the first lens element L1 and the required length of the imaging lens becomes longer. On the other hand, if the ratio of Condition (2) is larger than the upper limit of Condition (2), the refractive power of the first lens element L1 becomes so large that it is difficult to adequately correct the spherical aberration.

By adopting a three-component, three-element configuration of the imaging lens and by making all six lens surfaces be aspheric, the imaging lens can be both small and well-corrected for aberrations. In addition, by placing a stop St that operates as an aperture stop on the object side of all the lens elements, the overall length of the imaging lens can be shortened, and the light incident onto the image surface Simg may be made to be almost parallel to the optical axis Z1. Thus, a compact configuration having telecentric properties that are advantageous for use with certain image pickup devices can be achieved.

With regard to the lens surfaces, the lens surface S2 on the object side of the first lens element L1 is designed to be convex near the optical axis in order to effectively shorten the overall length of the imaging lens. Moreover, the lens surface S7 on the image side of the third lens element L3 is designed to be concave in a central area near the optical axis and convex at the periphery in order to suppress distortion in the image.

lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 9.8086E-1 | -8.1536E-3 | -4.0794E-2 | -6.6396E-3 | -1.6162E-1 | -2.3711E-4 | 1.7511E-1 | -6.3206E-6 | -1.5875E-1 |
| 2 | 1.1404 | 7.0975E-3 | -9.1766E-2 | -5.6133E-4 | -2.4454E-2 | 1.2952E-4 | 4.7730E-2 | 2.2237E-5 | -3.0505E-2 |
| 3 | -2.8789E-1 | -9.5074E-4 | -7.9996E-2 | -1.5478E-3 | 2.8384E-1 | -1.3309E-3 | -1.3774E-1 | -1.7186E-4 | 2.5106E-2 |
| 4 | -5.5281 | -1.7672E-2 | -1.1385E-1 | -4.9264E-3 | 1.3833E-1 | -4.8065E-4 | -3.7645E-2 | 4.4510E-4 | 3.7511E-3 |
| 5 | 9.9295E-1 | -2.3527E-2 | -1.3241E-2 | -1.6968E-3 | 4.8154E-4 | 3.2870E-4 | 6.6517E-5 | -2.9606E-5 | -3.7165E-5 |
| 6 | 9.5713E-1 | -2.5106E-2 | -7.0775E-3 | -1.9717E-3 | -4.1349E-4 | 8.5663E-5 | 1.5066E-4 | 7.1274E-5 | -4.8522E-5 |

Embodiments 1 and 2 of the present invention will now be individually described with further reference to the drawings. In the following descriptions, references will be frequently made to a "lens element." However, as set forth above, it is understood that numerous of the lens elements described below may be replaced by lens components that include more than one lens element.

Optimum optical properties suitable for the characteristics of the imaging device used with the imaging lens can be chosen by selecting either Embodiment 1 or Embodiment 2 that follows. In this regard, one consideration is that Embodiment 1, shown in FIG. 1, has an f-number of 3.5, whereas Embodiment 2, shown in FIG. 2, has an f-number of 2.4. Thus, Embodiment 2 provides a brighter, as well as a slightly more compact, imaging lens. However, although the f-numbers are different in Embodiments 1 and 2, both embodiments are compact and favorably correct aberrations, especially when Conditions (1) and (2) above are satisfied.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 1. Listed in the bottom portion of Table 1 are the focal length f, the f-number $F_{NO}$, the maximum image angle 2ω, and the on-axis distance TCL from the diaphragm stop St to the image plane Simg for Embodiment 1. The radius of curvature is infinity (∞) at the planar surfaces of the cover plate SG.

TABLE 1

| # | R | D | $N_d$ | $v_d$ |
|---|---|---|---|---|
| 1 (stop) | ∞ | 0.1436 | | |
| 2 | 4.0645 | 0.9570 | 1.5311 | 55.5 |
| 3 | -1.6928 | 0.5835 | | |
| 4 | -0.7380 | 1.0193 | 1.5836 | 30.2 |
| 5 | -1.5562 | 0.4734 | | |
| 6 | 2.7643 | 1.4687 | 1.5311 | 55.5 |
| 7 | 4.5084 | 1.1161 | | |
| 8 | ∞ | 0.5580 | 1.5168 | |
| 9 | ∞ | 0.0958 | | | f = 4.0 mm
$F_{NO}$ = 3.5
2ω = 64.2°
TCL = 6.4 mm

Table 2 below lists the values of the constants K, and $A_3$–$A_{10}$ used in Equation (A) above for each of the aspheric The imaging lens of Embodiment 1 satisfies both Conditions (1) and (2) above as set forth in Table 3 below.

TABLE 3

| Condition No. | Condition | Value |
|---|---|---|
| (1) | 25 < $v_2$ < 45 | 30.2 |
| (2) | 1.3 < f/f1 < 1.8 | 1.68 |

Figure 3A:
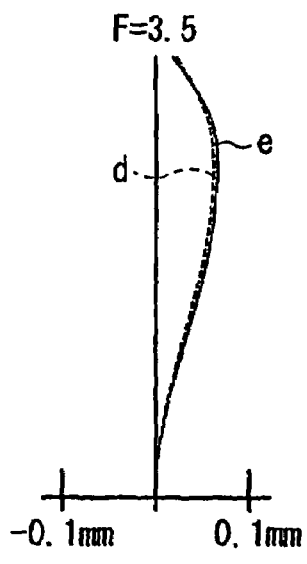
FIGS. 3A–3C show aberrations of the imaging lens according to Embodiment 1.
Figure 3B:
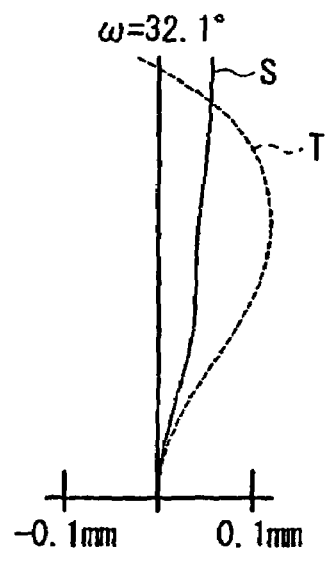
Figure 3C:
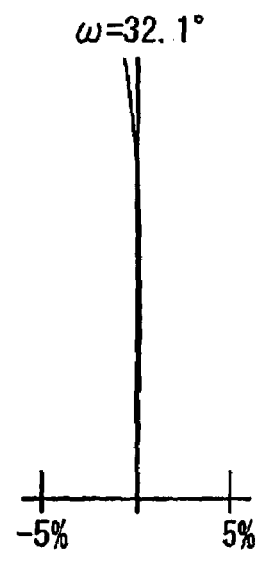

FIGS. 3A–3C show the spherical aberration, astigmatism, and distortion, respectively, of the imaging lens according to Embodiment 1. In FIG. 3A, the spherical aberration is shown for the e-line (λ=546.1 nm) and the d-line (λ=587.56 nm). As shown in FIG. 3A, the f-number of this embodiment is 3.5. In FIG. 3B, the astigmatism is shown at the e-line (λ=546.1 nm) for both the sagittal image surface S and the tangential image surface T. In FIG. 3C the distortion is shown at the e-line (λ=546.1 nm). The half-image angle ω for this embodiment is 32.1°.

As is clear from the lens data and aberration curves discussed above, in Embodiment 1 the various aberrations are favorably corrected, and performance capabilities that are suitable for a small imaging device can be obtained.

Embodiment 2

Figure 2:
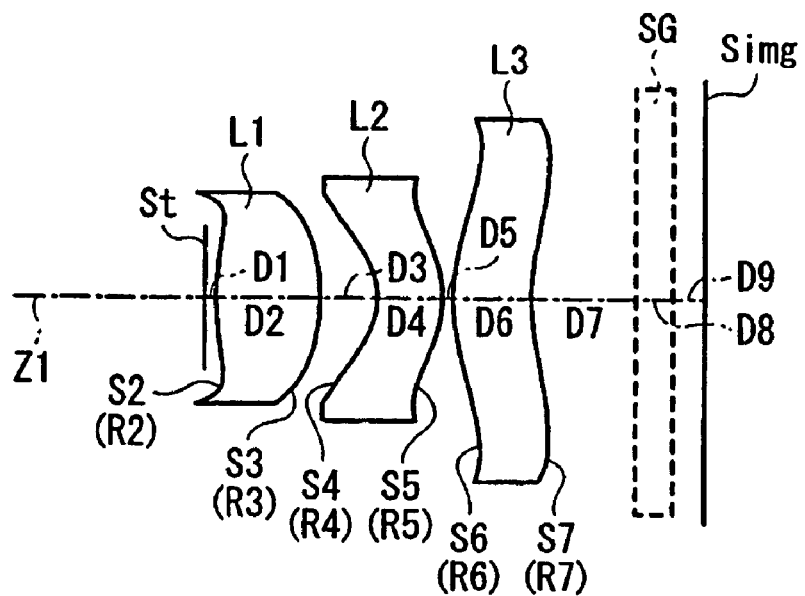
FIG. 2 is a cross-sectional view of the imaging lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 2. Listed in the bottom portion of Table 4 are the focal length f, the f-number $F_{NO}$, the maximum image angle 2ω, and the on-axis distance from the diaphragm stop St to the image plane Simg (TCL) for Embodiment 2. The radius of curvature is infinity (∞) at the planar surfaces of the cover plate SG.

TABLE 4

| # | R | D | $N_d$ | $v_d$ |
|---|---|---|---|---|
| 1 (stop) | ∞ | 0.1261 | | |
| 2 | 2.8643 | 1.1161 | 1.5311 | 55.5 |
| 3 | -2.3739 | 0.6184 | | |
| 4 | -0.6599 | 0.6822 | 1.5836 | 30.2 |
| 5 | -1.1365 | 0.1136 | | |
| 6 | 1.7287 | 0.8598 | 1.5311 | 55.5 |
| 7 | 1.9151 | 1.1529 | | |

TABLE 4-continued

| # | R | D | $N_d$ | $v_d$ |
|---|---|---|---|---|
| 8 | ∞ | 0.4000 | 1.5168 | |
| 9 | ∞ | 0.3393 | | | f = 3.7 mm
$F_{NO}$ = 2.4
2ω = 65.2°
TCL = 5.4 mm

Table 5 below lists the values of the constants K, and $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.0200 | -4.9246E-2 | 1.1392E-1 | -1.1337E-1 | -1.6626E-1 | 3.8702E-2 | 2.5209E-1 | 7.0395E-3 | -2.2697E-1 |
| 2 | 1.1846 | 2.5741E-2 | -8.8401E-2 | -1.7600E-2 | -4.8302E-2 | 3.7208E-3 | 6.9450E-2 | 2.9505E-3 | -4.3145E-2 |
| 3 | 5.4547E-2 | 2.2887E-1 | -1.3251E-2 | -1.2624E-1 | 3.1404E-1 | 1.5610E-3 | -1.7394E-1 | 6.7735E-3 | 4.0170E-2 |
| 4 | -5.2765 | -3.4282E-2 | -1.4959E-1 | 5.0785E-2 | 1.6916E-1 | -7.4048E-3 | -5.1967E-2 | 4.7591E-4 | 5.1030E-3 |
| 5 | 2.8320E-1 | -8.7033E-2 | -5.8109E-3 | -5.2420E-2 | 2.6423E-2 | 1.7786E-2 | -5.2699E-3 | -7.5829E-3 | 2.5964E-3 |
| 6 | 1.4177E-1 | -4.6906E-2 | -1.3795E-1 | 6.1816E-2 | 2.2317E-2 | -1.4424E-2 | -5.5949E-3 | 4.2663E-3 | -7.3668E-4 |

The imaging lens of Embodiment 2 satisfies both Conditions (1) and (2) above as set forth in Table 6 below.

TABLE 6

| Condition No. | Condition | Value |
|---|---|---|
| (1) | 25 < $v_2$ < 45 | 30.2 |
| (2) | 1.3 < f/f1 < 1.8 | 1.42 |

Figure 4A:
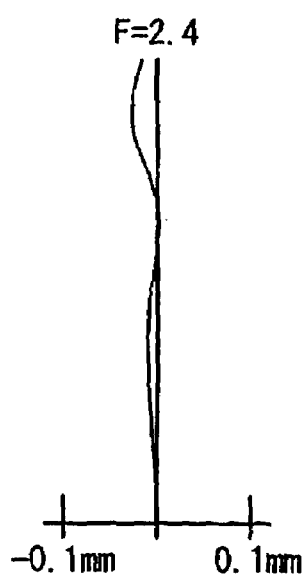
FIGS. 4A–4C show aberrations of the imaging lens according to Embodiment 2.
Figure 4B:
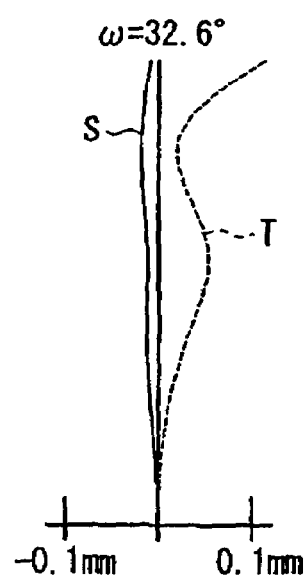
Figure 4C:
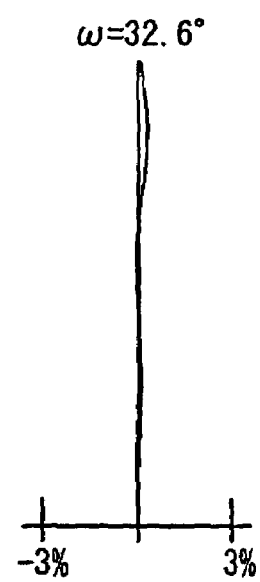

FIGS. 4A–4C show the spherical aberration, astigmatism, and distortion, respectively, of the imaging lens according to Embodiment 2. In FIG. 4A, the spherical aberration is shown for the e-line (λ=546.1 nm) and the d-line (λ=587.56 nm). As shown in FIG. 4A the f-number of this embodiment is 2.4. In FIG. 4B, the astigmatism is shown at the e-line (λ=546.1 nm) for both the sagittal image surface S and the tangential image surface T. In FIG. 4C the distortion is shown at the e-line (λ=546.1 nm). The half-image angle ω for this embodiment is 32.6°.

As is clear from the lens data and aberration curves discussed above, in Embodiment 2 the various aberrations are favorably corrected, and performance capabilities that are suitable for a small imaging device can be obtained.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens formed of only three lens components, arranged along an optical axis in order from the object side, as follows:
 a stop;
 a first lens component;
 a second lens component; and
 a third lens component;
wherein
 all three object-side lens surfaces and all three image-side lens surfaces of the three lens components are aspheric;
 the first lens component has positive refractive power, its lens surface on the object side is convex in a central area near the optical axis with the optical axis as an axis of rotational symmetry, and its lens surface on the image side is convex with the optical axis as an axis of rotational symmetry;
 the second lens component has negative refractive power, its lens surface on the object side is concave in a central area near the optical axis with the optical axis as an axis of rotational symmetry, and its lens surface on the image side is convex in a central area near the optical axis with the optical axis as an axis of rotational symmetry; and
 the third lens component has positive refractive power, its lens surface on the object side is convex in a central area near the optical axis with the optical axis as an axis of rotational symmetry, its lens surface on the image side is concave in a central area near the optical axis with the optical axis as an axis of rotational symmetry, and its lens surface on the image side becomes convex at the periphery with the optical axis as an axis of rotational symmetry.

2. The imaging lens of claim 1, wherein:
 the second lens component consists of a single lens element; and
 the following condition is satisfied:

25<$v_2$<45 where
 $v_2$ is the Abbe number of said lens element.

3. The imaging lens of claim 1, wherein each of the three lens components consists of a single lens element.

4. The imaging lens of claim 2, wherein each of the first lens component and the third lens component consists of a single lens element.

5. The imaging lens of claim 1, wherein the following condition is satisfied:

1.3<f/f1<1.8 where
 f is the focal length of the imaging lens, and
 f1 is the focal length of the first lens component.

6. The imaging lens of claim 2, wherein the following condition is satisfied:

$$1.3 < f/f1 < 1.8$$

where
- f is the focal length of the imaging lens, and
- f1 is the focal length of the first lens component.

7. The imaging lens of claim 3, wherein the following condition is satisfied:

$$1.3 < f/f1 < 1.8$$

where
- f is the focal length of the imaging lens, and
- f1 is the focal length of the first lens component.

8. The imaging lens of claim 4, wherein the following condition is satisfied:

$$1.3 < f/f1 < 1.8$$

where
- f is the focal length of the imaging lens, and
- f1 is the focal length of the first lens component.

9. The imaging lens of claim 1, wherein the lens material of the first lens component is optical glass.

10. The imaging lens of claim 2, wherein the lens material of the first lens component is optical glass.

11. The imaging lens of claim 3, wherein the lens material of the first lens component is optical glass.

12. The imaging lens of claim 4, wherein the lens material of the first lens component is optical glass.

13. The imaging lens of claim 5, wherein the lens material of the first lens component is optical glass.

14. The imaging lens of claim 6, wherein the lens material of the first lens component is optical glass.

15. The imaging lens of claim 7, wherein the lens material of the first lens component is optical glass.

16. The imaging lens of claim 8, wherein the lens material of the first lens component is optical glass.

* * * * *